(12) United States Patent
Walters et al.

(10) Patent No.: US 6,331,017 B1
(45) Date of Patent: Dec. 18, 2001

(54) PAPER FORMS/DOCUMENTS

(75) Inventors: Stephen Arthur Walters, Bristol; John Finch, Bradley Stoke, both of (GB)

(73) Assignee: Continu-Forms Holdings PLC, Radstock (GB)

( * ) Notice: Subject to any disclaimer, the term of this patent is extended or adjusted under 35 U.S.C. 154(b) by 0 days.

(21) Appl. No.: 09/409,281

(22) Filed: Sep. 30, 1999

(30) Foreign Application Priority Data

Sep. 30, 1998 (GB) .................................... 9821117

(51) Int. Cl.⁷ .................................... B42D 15/00
(52) U.S. Cl. .................... 283/62; 281/2; 283/67; 462/12
(58) Field of Search .................. 283/82, 83, 61, 283/62, 904, 67, 70; 281/25, 3.1, 38; 462/7, 8, 12, 66

(56) References Cited

U.S. PATENT DOCUMENTS

| | | | |
|---|---|---|---|
| 4,536,013 | * | 8/1985 | Haghiri-Therani et al. ....... 283/82 X |
| 5,403,236 | | 4/1995 | Greig . |
| 5,439,255 | * | 8/1995 | McIntire et al. .................. 283/61 X |
| 5,667,247 | | 9/1997 | Ramsburg et al. . |
| 6,039,356 | * | 3/2000 | Warther et al. .................... 283/82 X |

FOREIGN PATENT DOCUMENTS

| | | |
|---|---|---|
| 825-035 A2 | 2/1998 | (EP) . |
| 95/19892 | 7/1995 | (WO) . |

\* cited by examiner

Primary Examiner—Willmon Fridie, Jr.
(74) Attorney, Agent, or Firm—Wenderoth, Lind & Ponack, L.L.P.

(57) ABSTRACT

A form 10 has a portion 14 laminated on both sides with polyester film and defined by die cuts along lines 13. The portion 14 is, therefore, removable, and has a magnetic recordal tape 25 incorporated therein.

17 Claims, 2 Drawing Sheets

PAPER FORMS/DOCUMENTS

FIELD OF THE INVENTION

The present invention relates to forms or documents preferably of paper on which is printed variable data such as personal details for example names, addresses and other individual information.

SUMMARY OF THE INVENTION

According to a first aspect of the present invention there is provided a form having front and reverse sides and incorporating a removable portion therein, the form incorporating a sheet of printable material, preferably paper and being adapted to have variable data printed on at least one side, the removable portion having a first sealing layer applied to its front side and a second sealing layer applied to its reverse side, and data means being provided on at least one side of the removable portion for recordably receiving machine readable data.

In some embodiments said data means comprises a strip of magnetic recording tape. In other embodiments said data means comprises a chip.

Conveniently said data means is applied externally of the sealing layer, but with some arrangements said data means is disposed between the sheet and one of the sealing layers.

Preferably the sealing layers comprise polyester films.

Sometimes, however, one sealing layer comprises a varnish coating applied to the outward facing surface of the sheet on the other side of the removable portion to the data means, the sealing layer on said one side comprising a polyester film. In some arrangements a base sheet is provided on said other side of the removable portion and extends beyond the removable portion.

Ideally, the removable portion is defined by a die cut which penetrates the form through to, but not including, the base sheet where such a base sheet is provided. It is a further preferred feature that one or both polyester films are printer compatible such that variable data can be printed thereon.

According to a second aspect of the present invention there is provided a method of producing a form having front and reverse sides, the method comprising the steps of applying sealing layer to the front and reverse sides of a predetermined area of a sheet of printable material, preferably paper, said predetermined area in use defining a removable portions applying data means on at least one side of said predetermined area, printing variable data on to one or both sides of the form and recording machine readable data on to the data means.

Preferably the sealing layers are polyester film but in some methods there is the step of applying a varnish layer to the outward facing surface of the sheet on the side of the predetermined area which does not have the data means.

In preferred methods there is the further step of having a base sheet on the side of the predetermined area which does not have the data means.

Ideally the removable portion is defined by die cutting around said predetermined area through to but not including the base sheet if provided.

With some preferred methods the variable data is printed before the application of the polyester films but in others, the polyester films may be printer compatible.

The printing of the variable data may be on both sides of the form and may include variable data on the removable and non-removable portions of the form.

BRIEF DESCRIPTION OF THE DRAWINGS

Embodiments of the invention will now be described in more detail. The description makes reference to the accompanying drawings, in which.

DETAILED DESCRIPTION OF THE PREFERRED EMBODIMENTS

Figure 2:
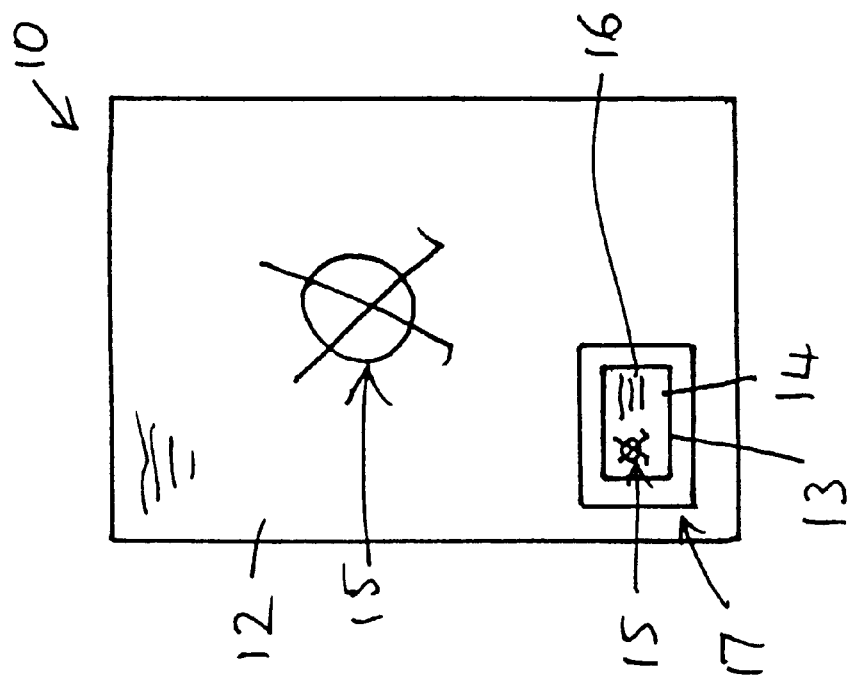
FIG. 2 is a reverse side of the FIG. 1 arrangement.
Figure 1:
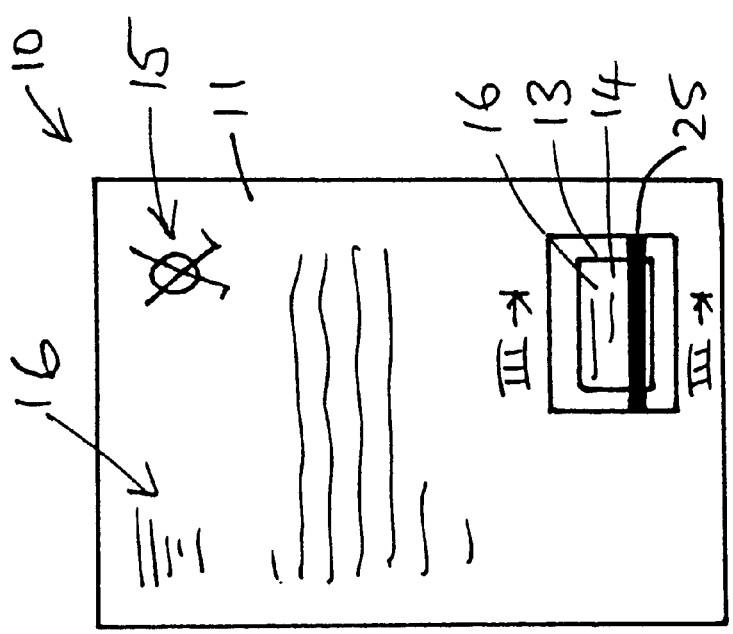
FIG. 1 is a front view of a paper form according to the present invention.

In the figures there is shown a paper form 10 which may be an A4 sheet of paper but could be of any size or shape. The form 10 has a front side 11 and a reverse side 12. In FIGS. 1 and 2 there is indicated by lines 13 an area which in the finished form will be a removable, credit card shaped portion 14 although it will be appreciated that the card portion 14 could be of any shape or size.

Starting with a plain sheet 10, the sheet 10 may be printed on front and/or reverse sides 11, 12 with static information 15 which will not chance such as the letterhead, logo and graphics of the company sending the form. This static information 15 will not alter depending on the recipient of the form. The static information 15 could even include the contents of a standard letter. Static information is also likely to be printed within the lines 13.

Variable information or data 16 can then be printed on to the front side 11 probably including the area within the lines 13 and possibly on to the reverse side 12 as well. This variable data 16 changes depending on the recipient of the form and can include names, addresses, policy or account numbers or other personalised information relevant to the intended recipient.

A patch 17 is then applied to the reverse side 12 of the form 10, covering the area defined by the lines 13. The patch 17 is of laminar construction and comprises a layer 18 of non-peelable adhesive, a polyester film layer 19, an optional varnish coating 20, a non-peelable adhesive layer 21 and a base sheet 22 which in use is the remotest layer from the paper form 10. The base sheet 22 may be paper or a transparent or opaque sheet.

On the front of the form 10 a further polyester film layer 23 with a non-peelable adhesive layer 24 is secured over the area defined by the lines 13. Data means in the form of a length of magnetic recordal tape 25 is then attached over at least part of the area defined by the lines 13 using a suitable non-peelable adhesive 26. The polyester film layers may be transparent, semi-transparent or opaque.

The form 10 is then passed through a die-cut machine which produces cuts 27 through all layers except the base sheet 22, following the path defined by the lines 13 so as to produce a removable card 14, the non-peelable adhesive layer 21 allowing removal from the base sheet 22. If this card 14 has variable data printed on the paper, the variable data is effectively being sealed in by the polyester film layers 19 and/or 23 so that the data cannot be tampered with.

It will be appreciated that in the drawings the thickness of the layers of the card 14 have been exaggerated so as to clarify the construction. In one envisaged use the card 14 may be used as a loyalty card for a shop, the tape 25 containing personal customer details, the card also showing corporate graphics relating to the shop (static information).

Other uses will also be apparent to the reader such as credit cards, travel cards, parking permits as well as many other applications.

The forms 10 may be produced as individual sheets or as part of a continuous system with a number of forms detachably connected in series.

Also the polyester film layers 19, 23 may be printing compatible so that the variable data can be applied after the components of the card have been attached to the paper form 10. The actual printing of all variable data may be by any known printing means such as laser, ink jet, digital and the formation of the label could be by cutting methods other than die cutting.

In the specific arrangement described above the following materials have been found to be suitable for the layers but it will be appreciated that variations and modifications in composition and thickness will be possible.

Base sheet (22)—45 micron paper sheet/film
Non-peelable adhesive (21)—E326 adhesive produced by PCP (Precision Coated Products)
Polyester film (19)—50 micron transparent polyester film
Non-peelable adhesive (18)—E326 adhesive produced by PCP
Paper form (10)—Printer paper
Non-peelable adhesive (24)—E326 adhesive produced by PCP
Polyester film (23)—50 micron transparent polyester film
Magnetic tape (25)—10 micron to ISO7811 standard A throw away liner would also be attached to the patch 17 prior to attachment to the form 10.

Figure 4:
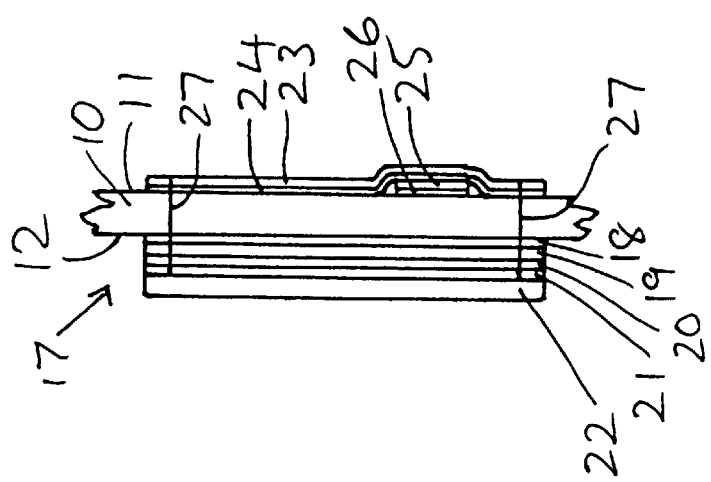
FIG. 4 shows a section similar to FIG. 3 of an alternative embodiment.
Figure 3:
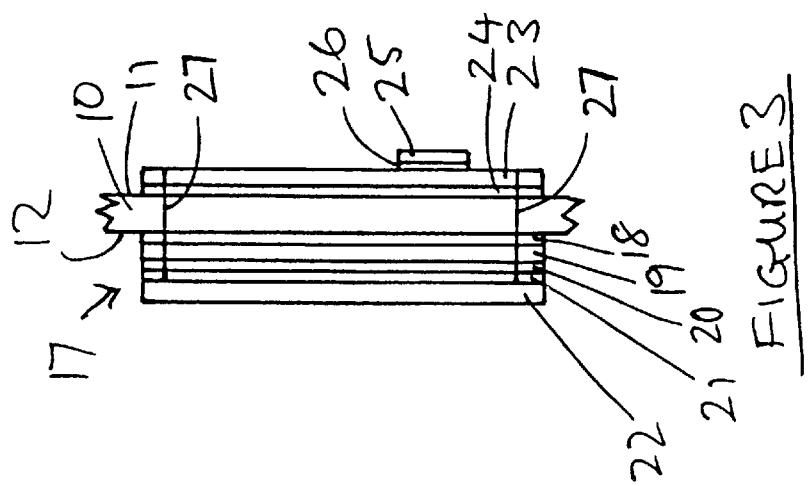
FIG. 3 is an exaggerated section on lines III—III of FIG. 1.

In alternative arrangements the magnetic recordal tape 25 could be applied between the form 10 and the further polyester film layer 23 to give some protection to the tape 25. This is shown in FIG. 4. The tape 25 could also be formed as part of the polyester film layer 23.

Figure 5:
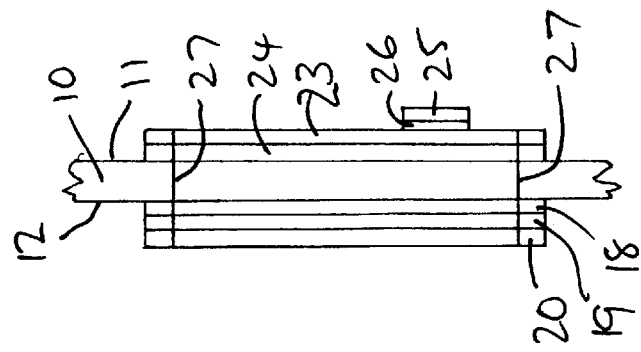
FIG. 5 shows a section similar to FIG. 3 of a further alternative embodiment.

In the further alternative embodiment shown in FIG. 5, the base sheet 22 and the non-peelable adhesive layer 21 are omitted. Also the die-cuts 27 are such that small unbreakable tabs retain the card shaped portion 14 attached to the remainder of the form until such time as it is needed. It can then be simply pressed out by hand breaking the retaining tabs.

Once the complete form has been assembled the personalised data can be recorded on to the tape 25 so as to relate to the intended recipient of the form 10. The recipient, on receipt, can then peel off the card 14 or press it out in the case of the FIG. 5 embodiment and use it for its intended purpose. It will of course be understood that the tape 25 is located on the card 14 in a position that allows the tape 25 to be read in a conventional manner using a suitable machine.

The printing of the variable data and the recordal of the tape need to be synchronised so that the personal details in the variable data relates to the information put on the tape 25. It is possible that a single machine could be used to print and record in one pass of the form 10.

It is also envisaged that the magnetic recordal tape 25 which is "read only" could be replaced by another type of recording medium. One such example would be a chip of the type which is now becoming used on smart cards such as store loyalty cards etc. The chips are more expensive than tape but are "read and write" in nature so as to provide a two-way communication with a compatible machine such that the information contained on the chip is able to be changed as the card 14 is used.

In other alternative arrangements the removable portion is double sized and has adhesive on its rear side when removed from the form 10. Once removed the double size removed portion is folded in half so that the rear sides are stuck together thereby forming a normal sized card. With such an arrangement variable data can be printed on to both sides of the card with only a single pass through a printer.

Further embodiments may involve the polyester film on the opposite side to the recordal tape being revealed and folded over by the intended recipient. Such an arrangement could enable a signature to be applied and then protected by the polyester film.

What is claimed is:

1. A form having front and reverse sides and incorporating:
    a sheet of printable material adapted to have data printed on at least one of the front and reverse sides of the sheet;
    a removable portion which incorporates part of said sheet and has a first sealing layer applied to the front side thereof and a second sealing layer applied to the reverse side thereof; and
    a data carrier provided on at least one side of said removable portion for recordably receiving machine readable data;
    wherein said removable portion is defined by a die cut that penetrates said sheet.

2. The form of claim 1, wherein said data carrier comprises a strip of magnetic recording tape.

3. The form of claim 1, wherein said data carrier comprises a chip.

4. The form of claim 1, wherein said data carrier is applied externally of one of said first and second sealing layers.

5. The form of claim 1, wherein said data carrier is disposed between said part of said sheet and one of said first and second sealing layers.

6. The form of claim 1, wherein said data carrier is incorporated in one of said first and second sealing layers.

7. The form of claim 1, wherein said sealing layers comprise polyester films.

8. The form of claim 1, wherein a varnish coating is applied to the surface of said sheet on the other side of said removable portion to said data carrier, the one of said first and second sealing layers on said at least one side comprising a polyester film.

9. The form of claim 1, wherein a base sheet is provided on the other side of said removable portion and extends beyond said removable portion.

10. The form of claim 1, wherein a base sheet is provided on the other side of said removable portion and extends beyond said removable portion, and the die cut does not penetrate the base sheet.

11. The form of claim 1, wherein at least one of said first and second sealing layers is printer compatible such that variable data can be printed thereon.

12. The form of claim 1, wherein said sheet is paper.

13. A method of producing a form having front and reverse sides comprising:
    applying sealing layers to the front and reverse sides of a predetermined area of a sheet of printable material;
    defining a removable portion by die cutting through said sheet around said predetermined area;
    applying a data carrier on at least one side of said predetermined area;
    printing variable data on to at least one side of said sheet; and recording machine readable data on to said data carrier;
wherein the removable portion incorporates part of the sheet of printable material.

14. The method of claim 13, and further comprising applying a base sheet on to a side of said predetermined area that does not have the data carrier.

15. The method of claim 13, wherein said printing of variable data takes place before said applying sealing layers.

16. The method of claim 13, wherein said printing of variable data takes place after said applying sealing layers.

17. The method of claim 13, wherein the sheet of printable material is paper and the sealing layers comprise polyester films.

* * * * *